United States Patent
Gibson et al.

(10) Patent No.: US 7,273,559 B2
(45) Date of Patent: *Sep. 25, 2007

(54) PROCESS FOR REMOVAL OF IMPURITIES FROM AN OXIDIZER PURGE STREAM

(75) Inventors: Philip Edward Gibson, Kingsport, TN (US); Kenny Randolph Parker, Afton, TN (US); Howard Wood Jenkins, Jr., West Columbia, SC (US)

(73) Assignee: Eastman Chemical Company, Kingsport, TN (US)

( * ) Notice: Subject to any disclaimer, the term of this patent is extended or adjusted under 35 U.S.C. 154(b) by 223 days.

This patent is subject to a terminal disclaimer.

(21) Appl. No.: 10/975,256

(22) Filed: Oct. 28, 2004

(65) Prior Publication Data

US 2006/0091081 A1 May 4, 2006

(51) Int. Cl.
*B01D 25/28* (2006.01)
(52) U.S. Cl. .................. 210/712; 210/721; 210/737; 210/763; 210/772; 210/774; 210/784; 210/806; 562/414
(58) Field of Classification Search ............ 210/784; 562/414
See application file for complete search history.

(56) References Cited

U.S. PATENT DOCUMENTS

| | | | |
|---|---|---|---|
| 2,964,559 A | 12/1960 | Burney et al. | |
| 3,840,641 A | 10/1974 | Wampfler et al. | |
| 3,873,468 A | 3/1975 | Kobinata et al. | |
| 3,950,409 A | 4/1976 | Yokota et al. | |
| 3,996,271 A | 12/1976 | Yokota et al. | |
| 4,081,464 A | 3/1978 | Marsh et al. | |
| 4,158,738 A | 6/1979 | Scott et al. | |
| 4,185,073 A | 1/1980 | Marsh et al. | |
| 4,219,669 A | 8/1980 | Tsuchiya et al. | |
| 4,298,580 A | 11/1981 | Harper et al. | |
| 4,330,676 A | 5/1982 | Moxham | |
| 4,356,319 A | 10/1982 | Roffia et al. | |
| 4,769,489 A | 9/1988 | Abrams et al. | |
| 4,914,230 A | 4/1990 | Abrams et al. | |
| 4,939,297 A | 7/1990 | Browder et al. | |
| 5,200,557 A * | 4/1993 | Gee et al. | ............. 562/486 |

(Continued)

FOREIGN PATENT DOCUMENTS

DE   2131470 A   6/1970

(Continued)

OTHER PUBLICATIONS

USPTO office action dated Jul. 19, 2006 for copending U.S. Appl. No. 10/455,017.

(Continued)

*Primary Examiner*—Peter A. Hruskoci
(74) *Attorney, Agent, or Firm*—Steven A. Owen; Bernard J. Graves, Jr.

(57) ABSTRACT

A process is disclosed that relates to the removal of impurities and the recovery of a mother liquor and wash filtrate from an oxidizer purge stream produced in the synthesis of carboxylic acid, typically terephthalic. More particularly, the process involves the removal of impurities and the recovery of a mother liquor and wash filtrate from an oxidizer purge stream and then routing the mother liquor and or wash filtrate to an oxidation zone.

35 Claims, 4 Drawing Sheets

U.S. PATENT DOCUMENTS

| | | | |
|---|---|---|---|
| 5,643,468 A * | 7/1997 | Ure | 210/771 |
| 5,676,847 A * | 10/1997 | Yamamoto et al. | 210/784 |
| 5,705,682 A | 1/1998 | Ohkashi et al. | |
| 5,770,765 A | 6/1998 | Ohkashi | |
| 5,840,965 A | 11/1998 | Turner et al. | |
| 5,916,422 A | 6/1999 | Kimura et al. | |
| 5,955,394 A * | 9/1999 | Kelly | 502/12 |
| 6,054,610 A * | 4/2000 | Lee et al. | 562/487 |
| 6,153,790 A * | 11/2000 | June et al. | 562/414 |
| 7,074,954 B2 | 7/2006 | Sheppard et al. | |
| 7,132,566 B2 * | 11/2006 | Sumner et al. | 562/486 |
| 2002/0016500 A1 | 2/2002 | Matsumoto et al. | |
| 2002/0193630 A1 | 12/2002 | Lin et al. | |
| 2004/0244536 A1 | 12/2004 | Lin | |
| 2004/0245176 A1 | 12/2004 | Parker et al. | |
| 2004/0249207 A1 | 12/2004 | Lin et al. | |
| 2004/0249208 A1 | 12/2004 | Lin et al. | |

FOREIGN PATENT DOCUMENTS

| | | |
|---|---|---|
| EP | 0 181 127 A2 | 5/1986 |
| EP | 0 764 627 A1 | 3/1997 |
| EP | 764 627 A1 | 3/1997 |
| EP | 0579715 B1 | 8/1997 |
| GB | 892766 | 3/1962 |
| GB | 1407705 | 9/1975 |
| GB | 2067563 | 7/1981 |
| JP | 46-14339 B | 4/1971 |
| JP | 49-123191 A | 11/1974 |
| JP | 51-145488 A | 12/1976 |
| JP | 54-25292 A | 2/1979 |
| JP | 62-25651 B2 | 8/1987 |
| JP | 09-048744 A | 2/1997 |
| JP | 9-157214 A | 6/1997 |
| JP | 10-114699 A | 5/1998 |
| JP | 11-349529 A | 12/1999 |
| JP | 3211396 B2 | 9/2001 |
| JP | 3232678 B2 | 11/2001 |
| JP | 59-53441 A | 3/2004 |
| KR | 1991-5989 B1 | 8/1991 |
| WO | WO 92/18453 | 10/1992 |
| WO | WO 92/18454 A1 | 10/1992 |
| WO | WO 93/24441 A | 12/1993 |
| WO | WO 97/27168 A1 | 7/1997 |
| WO | WO 97/30963 A | 8/1997 |
| WO | WO 00/31014 A1 | 6/2000 |
| WO | WO 01/55075 A2 | 8/2001 |

OTHER PUBLICATIONS

USPTO office action dated Jul. 19, 2006 for copending U.S. Appl. No. 10/455,018.

USPTO office action dated Jul. 19, 2006 for copending U.S. Appl. No. 10/455,016.

Treybal, Robert E., "Stagewise Contact, Single-Stage Extraction," *Mass-Transfer Operations*, Third Edition, 1980, pp. 490-555, McGraw-Hill Book Company.

BHS—Werk Sonthofen, *BHS-FEST Pressure Filter*, 1990, pamphlet, Santhofen, West Germany.

Copending U.S. Appl. No. 10/948,591, filed Sep. 24, 2004.

Copending U.S. Appl. No. 10/948,678, filed Sep. 24, 2004.

Office Action for copending U.S. Appl. No. 10/455,017.

USPTO Office Action dated May 17, 2007 for copending U.S. Appl. No. 11/201,512.

USPTO Office Action dated May 11, 2007 for copending U.S. Appl. No. 10/455,017.

USPTO Office Action dated May 14, 2007 for copending U.S. Appl. No. 10/455,018.

USPTO Office Action dated Mar. 14, 2007, for copending U.S. Appl. No. 10/455,016.

Copending U.S. Appl. No. 11/655,395, filed Jan. 19, 2007, Philip E. Gibson et al.

Copending U.S. Appl. No. 11/655,317, filed Jan. 19, 2007, Philip E. Gibson et al.

Copending U.S. Appl. No. 11/655,396, filed Jan. 19, 2007, Kenny R. Parker et al.

USPTO office action dated Jan. 18, 2007 for copending U.S. Appl. No. 10/455,017.

USPTO office action dated Nov. 30, 2006 for copending U.S. Appl. No. 10/975,252.

Office Action for copending U.S. Appl. No. 10/455,017, 2007.

* cited by examiner

PROCESS FOR REMOVAL OF IMPURITIES FROM AN OXIDIZER PURGE STREAM

FIELD OF INVENTION

This invention relates to the removal of impurities and the recovery of a mother liquor and a wash filtrate from an oxidizer purge stream produced in the synthesis of carboxylic acid, typically terephthalic acid, and then subsequently routing at least a portion of the mother liquor and/or wash filtrate back to an oxidation zone comprising at least one oxidation reactor.

BACKGROUND OF THE INVENTION

Terephthalic acid is commercially produced by oxidation of paraxylene in the presence of a catalyst, such as, for example, Co, Mn, Br and a solvent. Terephthalic acid is used in the production of polyester fibers, films, and resins and must be further treated to remove impurities formed as a result of the oxidation of paraxylene.

Figure 1:
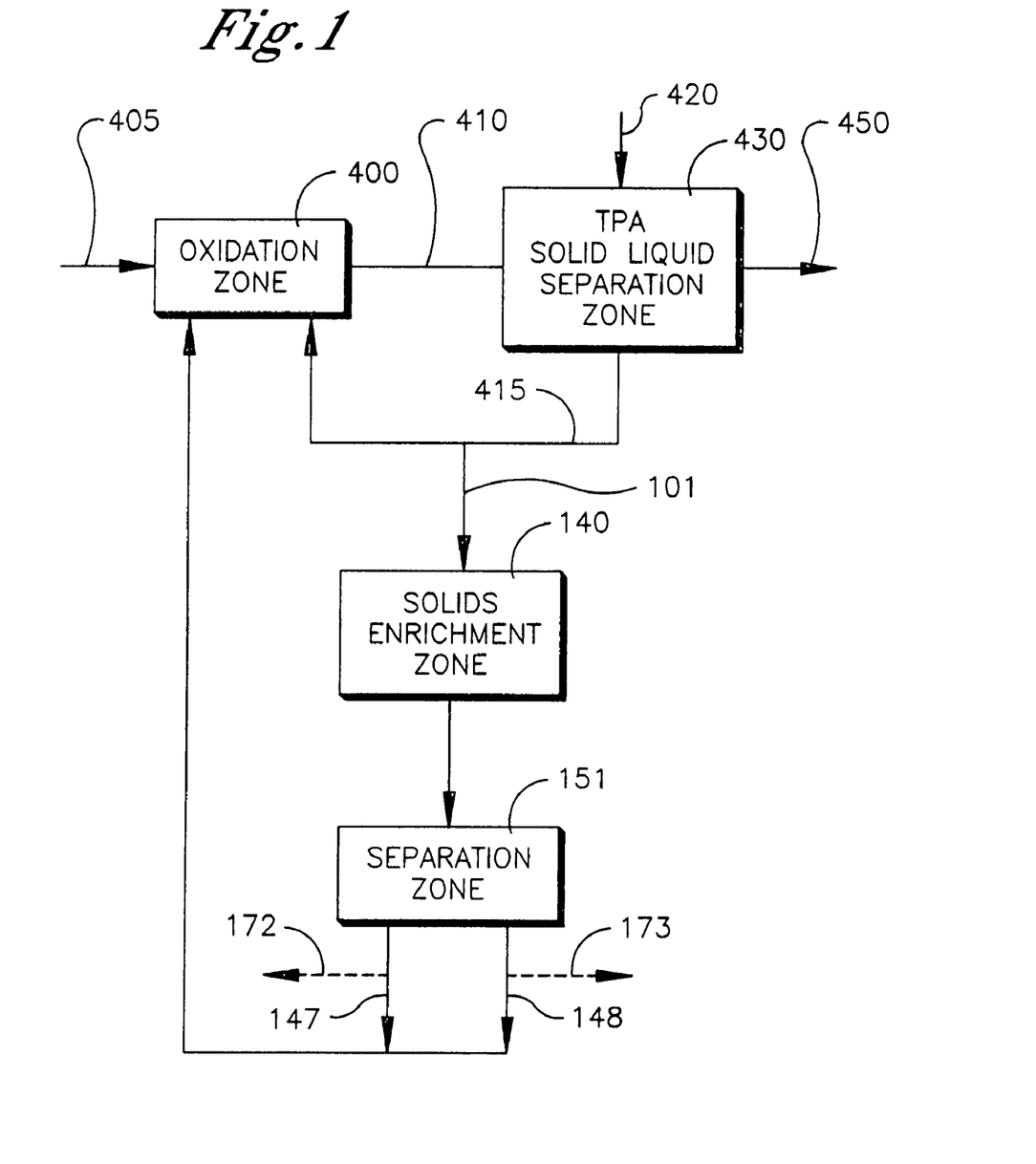
FIG. 1 illustrates a TPA manufacturing process where at least a portion of the combined wash filtrate 148 and/or mother liquor 147 is recycled back to the oxidation zone 400 via conduit 154.
Figure 2:
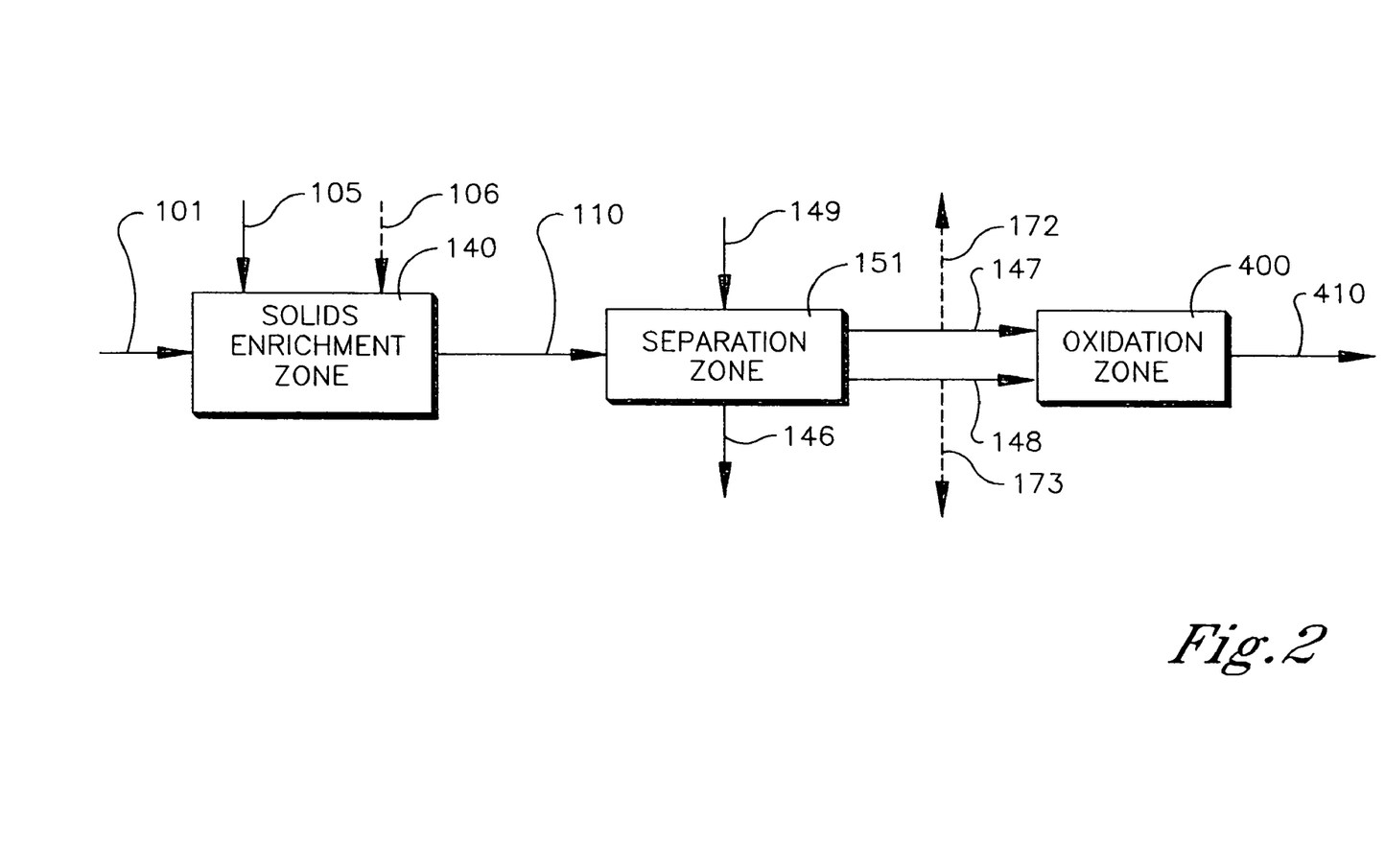
FIG. 2 illustrates an embodiment of the invention of the process occurring in the separation zone 151 wherein a mother liquor 147 and a wash filtrate 148 are produced and then a portion of the mother liquor 147 and/or wash filtrate 148 are routed to an oxidation zone comprising at least one oxidation reactor.

Terephthalic acid (TPA) is an intermediate in the production of polyesters for plastics and fiber applications. An example of a process for manufacturing TPA is shown in FIG. 1. Commercial processes for the manufacture of TPA are often based on the heavy-metal catalyzed oxidation of p-xylene, generally with a bromide promoter in an acetic acid solvent or the combinations of these can be known as the reaction mixture 405. Due to the limited solubility of TPA in acetic acid under practical oxidation conditions, a slurry of TPA crystals is usually formed in the oxidation zone 400 which comprises at least one oxidation reactor. Typically, the TPA oxidizer slurry 410 is withdrawn from the oxidation zone 400, and TPA solids 450 can then be separated from the oxidizer mother liquor 415 in a TPA solid liquid separation zone 430, using conventional solid-liquid separation techniques. The oxidizer mother liquor 415, which contains most of the catalyst and promoter used in the process, is recycled to the oxidation zone 400 comprising at least one reactor. Aside from the catalyst and promoter, the oxidizer mother liquor 415 also contains dissolved TPA and many by-products and impurities. These by-products and impurities arise partially from minor impurities present in the p-xylene feed stream. Other impurities arise due to the incomplete oxidation of p-xylene resulting in partially oxidized products. Still other by-products result from competing side reactions formed as a result of the oxidation of p-xylene to terephthalic acid. Patents disclosing the production of terephthalic acid such as U.S. Pat. No. 4,158,738 and U.S. Pat. No. 3,996,271 are hereby incorporated by reference in their entirety to the extent that they do not contradict statements herein.

The TPA solids can undergo a solid-liquid separation wherein fresh solvent 420 is utilized to displace a major portion of the liquid component of the oxidizer mother liquor 415. After drying, the TPA solids are contaminated with impurities that were present in the oxidizer mother liquor 415 since these impurities may be incorporated into the TPA solids. Impurities are also present due to occlusions in the TPA crystal structure and due to incomplete removal of the oxidizer mother liquor 415 by the fresh solvent wash 420.

Many of the impurities in the oxidizer mother liquor 415 stream that is recycled are relatively inert to further oxidation. Such impurities include, for example, isophthalic acid, phthalic acid and trimellitic acid. Impurities, which may undergo further oxidation are also present, such as, for example, 4-carboxybenzaldehyde, p-toluic acid and p-tolualdehyde. Oxidation inert impurities tend to accumulate in the oxidizer mother liquor 415 upon recycle. The concentration of these inert impurities will increase in the oxidizer mother liquor 415 until an equilibrium is reached whereby the rate of removal of each impurity via the TPA product balances with the rate of formation and the rate of addition to the oxidation process. The normal level of impurities in commercial terephthalic acid makes it unsuitable for direct use in most polymer applications.

Conventionally, terephthalic acid has been purified either by conversion to a dimethyl ester or by dissolution in water with subsequent hydrogenation over standard hydrogenation catalysts. More recently, secondary oxidative treatments have been used to produce polymer-grade TPA. It is desirable to minimize the concentration of impurities in the mother liquor and thereby facilitate subsequent purification of TPA. In some cases, it is not possible to produce a purified, polymer-grade TPA unless some means for removing impurities from the oxidizer mother liquor 415 is utilized.

One technique for impurity removal from a recycle stream commonly used in the chemical processing industry is to draw out or "purge" some portion of the oxidizer mother liquor 415 that is recycled. Typically, the purge stream is simply disposed of or, if economically justified, subjected to various treatments to remove undesired impurities while recovering valuable components. One example is U.S. Pat. No. 4,939,297 herein incorporated by reference in their entirety to the extent that they do not contradict statements herein. The amount of purge required for control of impurities is process-dependent; however, a purge amount equal to 10-40%, hereafter known as oxidizer purge stream 101, of the total oxidizer mother liquor 415 stream that is recycled is usually sufficient to produce TPA adequate as feedstock for commercial polymer manufacture. However, in an embodiment of the invention a purge amount up to 100% could be used.

In the production of TPA, the percentage purge of the oxidizer mother liquor 415 necessary to maintain acceptable impurity concentrations, coupled with the economic value of the metal catalyst and solvent components in the oxidizer purge stream 101, make simple disposal of the oxidizer purge stream 101 economically unattractive. Thus, there is a need for a process that recovers a major portion of the valuable metal catalysts and acetic acid contained in the oxidizer purge stream 101 while removing a major portion of the impurities present in the oxidizer purge stream 101. The metal catalyst can be recovered in an active form suitable for reuse by direct recycling to the p-xylene oxidation step.

Disclosed is an invention to recover a wash filtrate 148 and mother liquor 147 from an oxidizer purge stream. The oxidizer purge stream 101 is sent to a separation zone and then the mother liquor/and or wash filtrate is recycled back to an oxidation reactor. In should be noted that the above described TPA process is for example only. The disclosed invention can apply to many different TPA processes that are capable of producing an oxidizer purge stream 101. Therefore, it should be noted that this invention does not just apply to the terephthalic acid process, but any process that produces an oxidizer purge stream 101 where recovery of a mother liquor 147 and wash filtrate 148 comprising a metal catalyst is needed.

SUMMARY OF THE INVENTION

This invention relates to removal of impurities and the recovery of at least a portion of a mother liquor and wash filtrate from an oxidizer purge stream produced in the synthesis of carboxylic acids, typically terephthalic acid.

It is an object of this invention to provide a process to remove impurities and to recover a mother liquor and wash filtrate from an oxidizer purge stream.

It is yet another object of this invention to provide a process for the removal of impurities and the recovery of a mother liquor and wash filtrate from an oxidizer purge stream produced in the synthesis of carboxylic acid, and routing at least a portion of the mother liquor and/or wash filtrate to an oxidation zone.

In a first embodiment of this invention, a process is provided. The process comprises:

(a) routing an oxidizer purge stream to a solids enrichment zone to form a purge slurry;

(b) subjecting said purge slurry to separation in a separation zone to produce a washed cake, mother liquor and a wash filtrate;

(c) routing at least a portion of said wash filtrate and at least a portion of said mother liquor to an oxidation zone.

In another embodiment of the invention, a process is provided. The process comprises:

(a) adding a precipitant agent to an oxidizer purge stream in a solids enrichment zone to form a purge slurry;

(b) subjecting said purge slurry to separation in a separation zone to produce a washed cake, mother liquor and a wash filtrate; and (c) routing at least a portion of said wash filtrate or at least a portion of said mother liquor to an oxidation zone.

In another embodiment of the invention, a process is provided. The process comprises:

(a) cooling an oxidizer purge stream in a solids enrichment zone to form a purge slurry;

(b) subjecting said purge slurry to separation in a separation zone to produce a washed cake, mother liquor and a wash filtrate; and (c) routing at least a portion of said wash filtrate or at least a portion of said mother liquor to an oxidation zone.

These objects, and other objects, will become more apparent to others with ordinary skill in the art after reading this disclosure.

DESCRIPTION OF THE INVENTION

In one embodiment of this invention, a process to remove impurities and to recover a mother liquor 147 and a wash filtrate 148 from an oxidizer purge stream 101 is provided as shown in FIGS. 1 though 4. Common numbers within the Figures indicate the same process stream. The process comprises the following steps.

The oxidizer purge stream 101 is withdrawn from a carboxylic acid oxidative synthesis process. The oxidizer purge stream 101 serves as the feed stream to the present process. The oxidizer purge stream 101 comprises carboxylic acid, water, a solvent, metal catalyst and at least one impurity. The impurity comprises at least one selected from the group consisting of organic bromides, corrosion metals, p-xylene oxidation by-products, and impurities derived as a result of impurities in the p-xylene. The organic bromides may be used as promoters in the oxidation reaction. Examples of corrosion metals are iron and chromium compounds, which inhibit, reduce or entirely destroy the activity of the metal catalyst. Aside from the catalyst and promoter, the oxidizer mother liquor stream 415 also contains by-products and impurities. These by-products and impurities arise partially from minor impurities present in the p-xylene feed stream. Other impurities arise due to the incomplete oxidation of p-xylene resulting in partially oxidized products. Still other by-products result from competing side reactions in the oxidation of p-xylene to terephthalic acid.

Carboxylic acids include aromatic carboxylic acids produced via controlled oxidation of an organic substrate. Such aromatic carboxylic acids include compounds with at least one carboxylic acid group attached to a carbon atom that is part of an aromatic ring, preferably having at least 6 carbon atoms, even more preferably having only carbon atoms. Suitable examples of such aromatic rings include, but are not limited to, benzene, biphenyl, terphenyl, naphthalene, and other carbon-based fused aromatic rings. Examples of suitable carboxylic acids include, but are not limited to, terephthalic acid, benzoic acid, p-toluic acid, isophthalic acid, trimellitic acid, naphthalene dicarboxylic acid, 2,5-diphenyl-terephthalic acid and mixtures thereof.

Suitable solvents include, but are not limited to, aliphatic mono-carboxylic acids, preferably containing 2 to about 6 carbon atoms, or benzoic acid and mixtures thereof and mixtures of these compounds with water. Preferably, the solvent is acetic acid mixed with water, in a ratio of about 5:1 to about 25:1, preferably between about 8:1 and about 20:1. Throughout the specification, acetic acid will be referred to as the solvent. However, it should be appreciated that other suitable solvents, such as those disclosed previously, may also be utilized.

Step (a) comprises routing an oxidizer purge stream 101 to a solids enrichment zone 140 to form a purge slurry 110.

In one embodiment of the invention, the solids enrichment zone 140 comprises a vessel suitable to allow cooling of the oxidizer purge stream 101 to produce the purge slurry 110. There are no particular requirements for this vessel other than it allows enough residence time to cool the oxidizer purge stream 101 to the desired temperature to produce the purge slurry 110. This can be accomplished by, for example, using an agitated vessel comprising cooling coils, or utilizing various heat exchangers known in the art. The solids enrichment zone 140 can comprise any device known in the art sufficient to cool the oxidizer purge stream 101 sufficiently to produce a purge slurry 110 wherein the oxidizer purge stream 101 has been cooled from at least 5° C. to at least 90° C. The amount of cooling will depend on the amount of precipitation that is desired. For example, the cooling of the oxidizer purge stream 101 can be at least 5° C. which is the difference in the temperature in Celsius between the oxidizer purge stream 101 and the purge slurry 110. Another range could be at least 10° C., at least 15° C., at least 20° C., at least 25° C., at least 30° C., at least 35° C., at least 40° C., at least 45° C., at least 50° C., at least 55° C., at least 60° C., at least 65° C., at least 70° C., at least 75° C., at least 80° C., at least 85° C., and at least 90° C. In another embodiment of the invention, the oxidizer purge stream 101 is at a temperature of about 80° C. to about 150° C. Another range is about 80° C. to about 140° C., and another range is about 85° C. to about 100° C.

In another embodiment the oxidizer purge stream 101 is charged to a solids enrichment zone 140 to cause solids to precipitate. The precipitation can be accomplished by any means known in the art. For example, one method is the addition of a precipitant agent stream 105 to the oxidizer purge. The precipitant agent 105 is charged to the solids enrichment zone 140 and causes precipitation of solids from the oxidizer purge stream 101. The precipitant agent 105 comprises any compound suitable to precipitate solids from the oxidizer purge stream 101. Suitable compounds include, but are not limited to, water, methanol, isopropanol, n-butanol, and isobutanol. Other precipitant agents 105 can be used are c1 to c6 alkyl acetates, such as but not limited to, n-propyl acetate, isopropyl acetate, isobutyl acetate, sec-butyl acetate, ethyl acetate, water, and n-butyl acetate.

In another embodiment of the invention for step (a) the oxidizer purge stream 101 can be concentrated by the removal of acetic acid. The concentration can be accomplished by any means known in the art. This can be accomplished by boiling away acetic acid to the extent that there is insufficient acetic acid solvent to keep the solute solids in solution. Another method of solvent removal is the use of a cross flow membrane system that allows acetic acid to cross the membrane as permeate resulting in a concentrate retentate.

In another embodiment of the invention for step (a) solids can be generated in the solids enrichment zone by any combination of cooling and precipitant agent addition.

In another embodiment of the invention the amount of solid in the solid(s) enrichment process can result in the purge slurry 110 having at least 1% by weight solids to at least 30% by weight solids. Another range is at least 1% by weight solids to at least 25% by weight solids, and another range is at least 1% by weight solids to at least 20% by weight solids. The solids enrichment can be accomplished by the cooling process described previously or in another embodiment of the invention, the purge slurry 110 can be produced from the oxidizer purge stream 101 though the use of evaporation of the solvent. Fox example, in another embodiment of the invention the solids enrich zone comprises an evaporator that could be used to evaporate the solvent. The evaporator can be an evaporator such as the one use in U.S. Pat. No. 4,939,297, or in U.S. patent application Ser. Nos. 10/455,016, 10/455,018 and 10/874,419 all of these are herein incorporated by reference to the extent they do not contradict statements made herein. In another embodiment of the invention, any means known in the art can be used so long as the desired content of solids in the purge slurry 110 is obtained.

Figure 3:
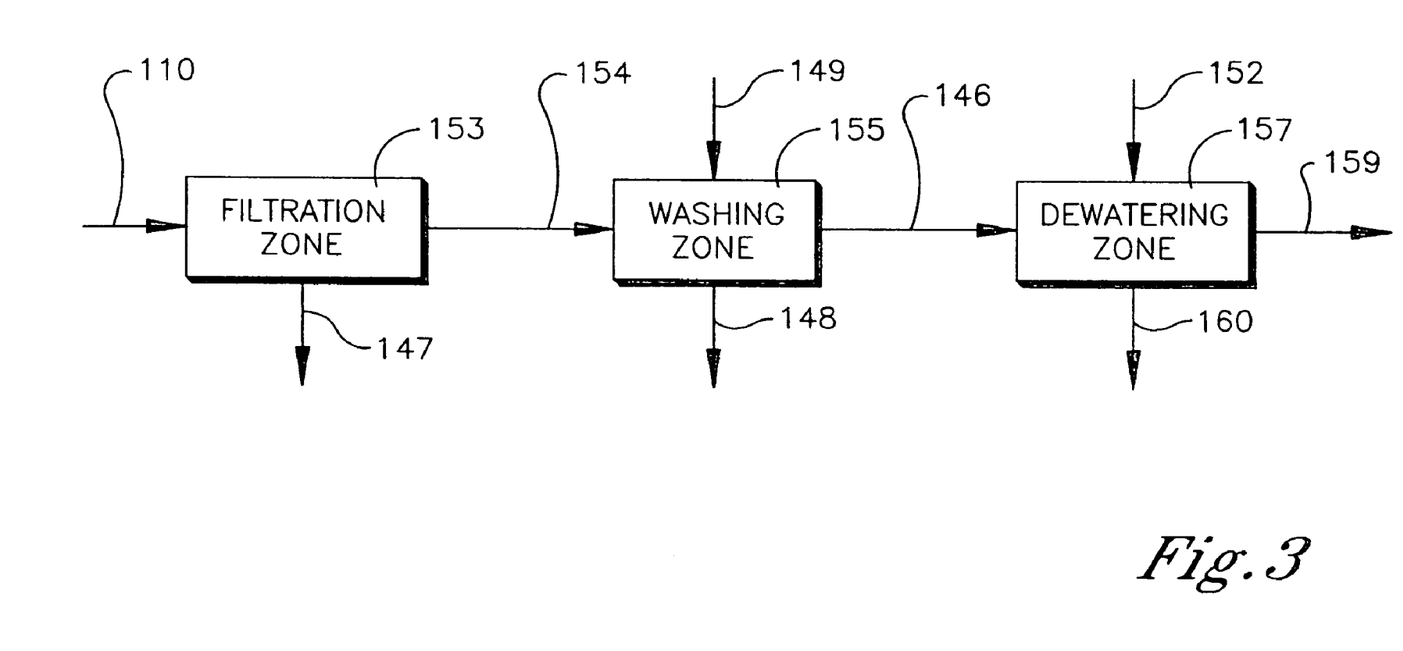
FIG. 3 illustrates another embodiment wherein the purge slurry 110 is routed to a separation zone 151 comprising a filtration zone 153, and a washing zone 155, and optionally, a drying zone 157.

Step (b) comprises separating the purge slurry 110 in a separation zone 151 to form a filter cake 154 and a mother liquor 147; and washing the filter cake 154 with a wash feed 149 in the separation zone 151 to form a washed cake 146 and a wash filtrate 148; and optionally dewatering the washed cake 146 in the separation zone 151 to form a dewatered cake 159; wherein the separation zone 151 comprises at least one pressure filtration device;

In another embodiment of the invention, the purge slurry 110 is introduced in the separation zone 151 wherein the separation zone comprises a filtration zone 153, a washing zone 155, and optionally a drying zone 157 as shown in FIG. 3. The filtration zone 153 comprises a filter cell, or a series of filter cells, physically situated to permit a filter cake 154 to develop a distribution across the area of the filter cell to hinder or prevent the channeling of wash feed 149 through the filter cake 154.

A filter cake 154 of at least 0.25 inch in depth to about 8 inches in depth, preferably at least 0.5 inch in depth, more preferably at least 1 inch in depth, and even more preferably about 2 to about 4 inches in depth is distributed over the area of the filter cell. The washed cake, 146, can be recovered or further treated, recycled and/or sent to waste treatment facilities.

Upon obtaining a suitable or preferred height of filter cake 154, about 0.5 inch to about 4 inches, the filter cake 154 leaves the filtration zone 153 which comprises a filter or series of filters and enters a washing zone 155 where the filter cake 154 is contacted with a wash feed 149. There is sufficient pressure across the filter cake 154 to allow a reservoir or buildup of the wash feed 149 over the filter cake 154 to a suitable depth, preferably to a minimum depth of 0.25 inch. A pressure gradient of at least 0.5 psi, preferably from about 5 psi to about 65 psi, across the filter cake 154 and the reservoir of wash feed 149 can be applied to displace any solute in the filter cake 154 with wash feed 149.

A filter cake 154 depth of at least 0.5 inches is suitable to obtain a filter cake 154 of sufficient compactness to furnish a wash vehicle, i.e. the filter cake 154, from which a wash filtrate 148 containing a solute from the filter cake 154 can be removed efficiently by displacement washing. If the filter cake depth 154 is less than about 0.25 inch, channeling of wash feed 149 in the filter cake 154 can occur resulting in non-uniform washing of the filter cake 154.

Because of the loss of efficiency in displacement washing of the filter cake 154, a minimum filter cake 154 depth of at least 0.25 inch, of purified terephthalic acid is preferred.

A minimum liquid height above the filter cake 154 surface is required to ensure that displacement washing occurs. This height must be sufficient to ensure that the filter cake 154 surface is completely covered with wash feed 149. If the filter cake 154 surface is not covered with wash feed 149, bypassing of the wash feed 149 can occur without adequate displacement of the solute in the filter cake 154. Because of irregularities in the filter cake 154 surface, a minimum liquid height of about 0.25 inch is preferred above the filter cake 154 surface.

It has been found that displacement of the solute from the filter cake 154 using the wash feed 149 at high pressure permits an efficient separation of catalyst metals from the filter cake 154. Another benefit of the high pressure is the reduction of wash feed 149 required to recover cobalt as shown in the examples.

Utilization of added stages in the separation zone 151 can decrease the amount of wash feed 149 required to reduce the total amount of metal catalyst retained in the filter cake 154. It is convenient therefore that a suitable number of stages of positive displacement washing be used to minimize total wash feed 149 used in displacement washing to reduce need for downstream waste treatment facilities.

It is understood that multiple stages of the displacement washing procedure can replace a single stage displacement washing procedure wherein the quantity of wash feed 149 is sufficient to obtain at least 80% recovery of the metal catalyst from the purge slurry 110 to the mother liquor 147 and the wash filtrate 148. Additionally, a procedure utilizing multiple stages of counter-current washing can be useful if reduction of the amount of wash feed 149 is determined to be advantageous.

In the process of the instant invention, a purge slurry 110 is introduced into one or more of a series of filter cells physically situated to permit a filter cake 154 of requisite thickness to develop.

Upon obtaining a minimum height of filter cake 154, about 0.25 to about 4 inches, the filter cake 154 leaves the filter or series of filters and enters a washing zone 155 where the filter cake 154 is washed with a wash feed 149. Pressure can then be applied to the wash feed 149 to displace the solute (i.e. the liquid and any dissolved compounds such as metal catalyst in the filter cake) of the filter cake 154. Upon displacement of the solute with the wash feed, the filter cake 154 can be discharged from the filtration zone 155 by any suitable means and the cycle repeated. In an embodiment of the invention the ratio of wash feed 149 to filter cake 154 discharge is within the range of from about 1:20 to about 20:1 to reduce the level of metal catalyst in the filter cake by greater than 95%.

Equipment for performing the requisite washing cycle can comprise a series of filter cells maintained in a suitable position to, permit a wash feed 149 flood to develop over the filter cells. In one embodiment of the invention, suitable equipment can comprise a rotary drum pressure filter with multiple filter cells, fitted with a means for discharging washed cake 146 from the filter cells. The filter cake 154 can be washed for as many times as required to develop a minimum concentration of metal catalyst in the washed cake 146 before discharging the washed cake 146 from the rotary drum filter.

A suitable pressure filter which can be adapted to the requirements of the instant invented process is a BHS-FEST™ rotary drum pressure filter, BHS-WERK, Sonthofen, D-8972, Sonthofen, West Germany, although other pressure filters which can accomplish the required operation can be used. Examples of other devices that can used in the solid-liquid separation zone 151 include, but are not limited to, pressure belt filters, filter presses, centrifuges, pressure leaf filters, and cross-flow filters. The pressure filter can be operated at a temperature and pressure sufficient to obtain at least 80% recovery of the metal catalyst from the solute of the mother liquor 147. Preferably, the pressure filter can be operated at a temperature of about 25° C. to about 160° C., and a pressure of 1 atmospheres to 50 atmospheres.

Figure 4:
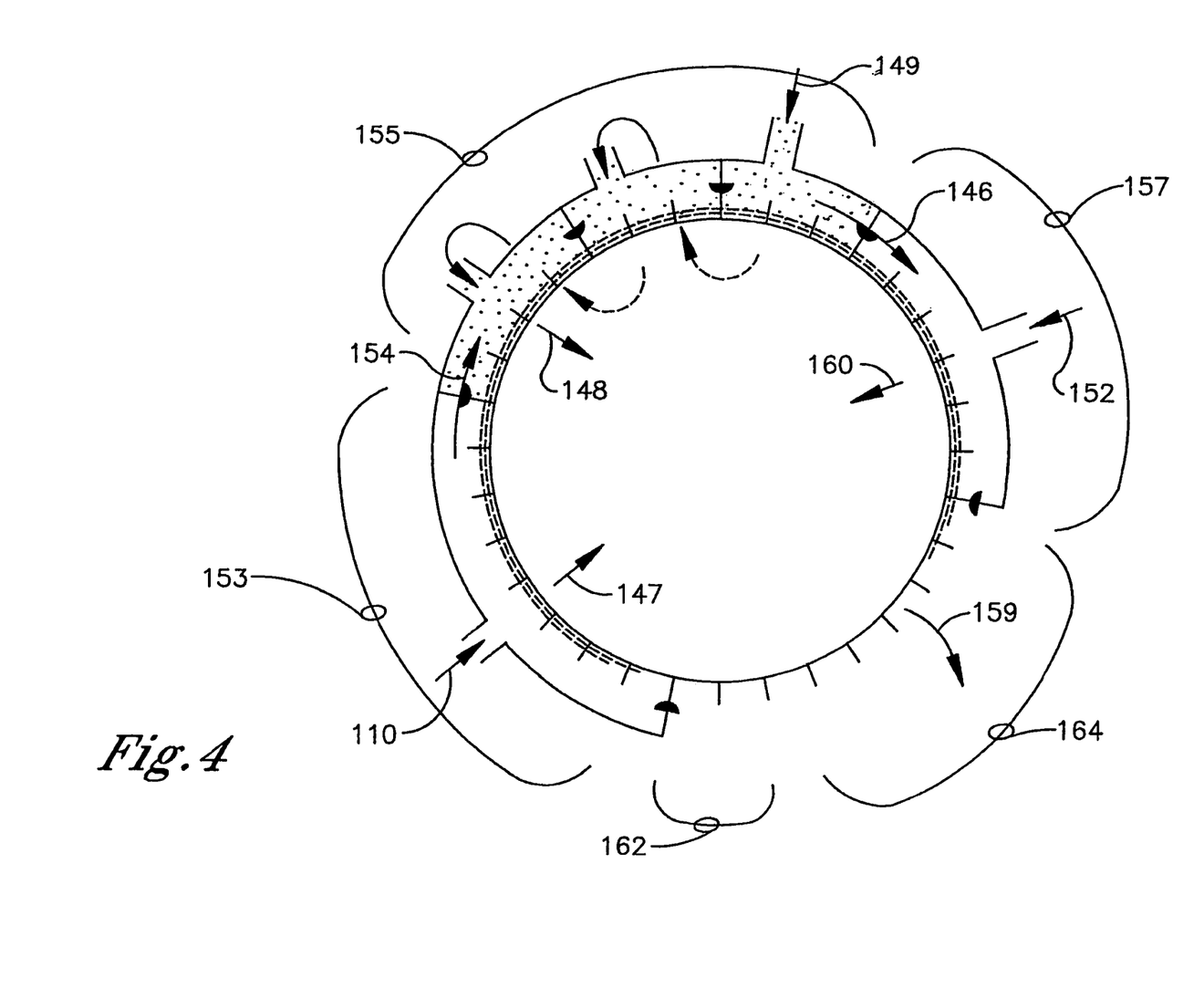
FIG. 4 illustrates another embodiment of the invention where a rotary drum pressure filter is utilized as the process filtration device. In another embodiment of the invention, the rotary drum pressure filter comprises a filtration zone 153, a wash zone 155, optionally, a dewatering zone 157, a discharge zone 164 and a cloth wash zone 162.

In the operation of the BHS-FEST™ filter as shown in FIG. 4, a rotary drum contains a series of filter cells located on the periphery of the rotating drum. As the drum rotates, the filter cells receive a purge slurry 110 and a filter cake 154 builds to a requisite depth. The mother liquor 147 is produced by filtration of the purge slurry 110. Upon rotation of the drum, the filter cake 154 enters a washing zone 155 where reservoir of wash feed 149 is built up over the filter cake 154 to a required depth. The applied pressure to the wash feed reservoir forces the water through the filter cake 154 to displace the solute (with dissolved metal catalyst) retained in the purge slurry 110 to produce a washed cake 146. Upon further rotation of the drum, the wash cycle can be repeated at least three more times if necessary in a counter current fashion, after which the system pressure is released with attendant temperature decrease to an ambient conditions. Optionally, the washed cake 146 can be dewatered in a dewatering zone 157 with a vapor via conduit 152 to produce a dewatered cake 159 and a humid vapor 160. The resultant dewatered cake 159 can then be discharged from the drum by any conventional means.

FIG. 4 illustrates an embodiment of the invention where a rotary pressure drum filter is utilized as the process filtration device. The rotary drum pressure filter comprises a filtration zone 153, a wash zone 155, optionally, a dewatering zone 157, a discharge zone 164 and a cloth wash zone 162. The cloth wash zone 164 shown in FIG. 4 is an embodiment of the invention where the rotary pressure drum filter comprises a cloth wash zone 162 where the filters are washed after discharge of the dewatered cake 159.

The wash filtrate 148 is produced by displacement washing the filter cake with the wash feed 149. The filter cake 154 within the separation zone 151 undergoes extraction of metal catalyst by introduction of the wash feed 149 to form the wash filtrate 148 wherein in an embodiment of the invention at least 80% of the metal catalyst is recovered in the wash filtrate and the mother liquor 147. In an embodiment of the invention, at least 90% of the metal catalyst is recovered in the wash filtrate 148 and the mother liquor 147. The mother liquor 147 and the wash filtrate 148 can optionally be combined before exiting the solid-liquid separation zone 151.

The wash feed 149 comprises water and optionally an additional oxidation solvent.

Perhaps most surprisingly, is that by utilizing water as a wash feed 149 at temperatures in the range of about 20° C. to about 70° C., preferably about 30° C. to about 50° C., sufficient corrosion metal is retained in the dewatered cake 159 wherein the need for corrosion metal removal by other means is eliminated. The dewatered cake 159 which represents solids stripped of metal catalyst can be disposed from the system.

It should be noted that one embodiment of the invention utilizing a rotary pressure drum filter the separation zone 151 can comprises any device known in the art sufficient to produce a mother liquor 147 and wash filtrate 148 from the purge slurry 110. For example such devices can include but are not limited to a centrifuge, decanter centrifuge, stack disk centrifuge, pressure filters such as candle filters, leaf filters, filter press and the like.

Step (c) comprises routing at least a portion of the wash filtrate and/or at least a portion of the mother liquor to an oxidation zone.

In an embodiment of the invention at least a portion of the mother liquor 147 and/or at least a portion of the wash filtrate 148 in step (e) can be recycled back to the oxidation zone 400 comprising at least one oxidation reactor in a terephthalic acid process, such as, but not limited to, the process described in FIG. 1. At least a portion can be any amount greater than 1% by weight. In another range, at least a portion can be any amount greater than 25% by weight. In another range, at least a portion can be any amount greater than 50% by weight. In another range, at least a portion can be any amount greater than 75% by weight. In another range, at least a portion can be 100% by weight. Conduits 172 and 173 represent the portion, if any, of mother liquor 147 and wash filtrate 148 respectfully that is not recycled back to the oxidation zone 400. These streams can be used in other processes or disposed of through incineration or any other means known in the art.

We claim:

1. A process comprising:
   (a) routing an oxidizer purge stream to a solids enrichment zone to form a purge slurry comprising a metal catalyst, said oxidizer purge stream comprising a purge from an oxidizer mother liquor, said oxidizer mother liquor recycled to an oxidation zone, and obtained from a solid liquid separation zone;
   (b) subjecting said purge slurry to separation in a separation zone comprising a filtration zone and a washing zone, to produce a washed cake, mother liquor and a wash filtrate; wherein at least 80% of said metal catalyst from said purge slurry is recovered through said separation zone into said mother liquor and said wash filtrate cumulative; and
   (c) routing at least a portion of said metal catalyst recovered from said separation zone to said oxidation zone.

2. The process according to claim 1 wherein said separation zone comprises at least one pressure filtration device.

3. The process according to claim 2 wherein said pressure filtration device comprises at least one filter cell and wherein at least one filter cell accumulates at least 0.25 inch in depth of said filter cake.

4. The process according to claim 3 wherein there is a reservoir over said filter cake which is at least 0.25 inch in depth.

5. The process according to claim 4 wherein said pressure filtration device operates at a temperature between about 25° C. to about 160° C.

6. The process according to claim 5 wherein said pressure filtration device is operated at a pressure of about 1 atmosphere to about 50 atmospheres.

7. The process according to claim 6 wherein said pressure filtration device is a rotary pressure drum filter.

8. The process according to claim 2 or 7 wherein said pressure filtration device is operated at a pressure of about 1 atmospheres to about 50 atmospheres.

9. A process comprising:
   (a) adding a precipitant agent to an oxidizer purge stream in a solids enrichment zone to form a purge slurry comprising a metal catalyst, said oxidizer purge stream comprising a purge from an oxidizer mother liquor, said oxidizer mother liquor recycled to an oxidation zone, and obtained from a solid liquid separation zone;
   (b) subjecting said purge slurry to separation in a separation zone comprising a filtration zone and a washing zone, to produce a washed cake, mother liquor and a wash filtrate; wherein at least 80% of said metal catalyst from said purge slurry is recovered through said separation zone into said mother liquor and said wash filtrate cumulative; and
   (c) routing at least a portion of said metal catalyst recovered from said separation zone to said oxidation zone.

10. The process according to claim 9 wherein said separation zone comprises at least one pressure filtration device.

11. The process according to claim 10 wherein said pressure filtration device comprises at least one filter cell and wherein at least one filter cell accumulates at least 0.25 inch in depth of said filter cake.

12. The process according to claim 11 wherein there is a reservoir over said filter cake which is at least 0.25 inch in depth.

13. The process according to claim 12 wherein said pressure filtration device operates at a temperature between about 25° C. to about 160° C.

14. The process according to claim 9 wherein step (c) comprises routing at least a 10 percent by weight of said wash filtrate or at least a portion of said mother liquor to said oxidation zone.

15. The process according to claim 9 wherein step (c) comprises routing at least a 50 percent by weight of said wash filtrate or at least a portion of said mother liquor to said oxidation zone.

16. The process according to claim 10 or 15 wherein said pressure filtration device is a rotary pressure drum filter.

17. The process according to claim 16 wherein said pressure filtration device is operated at a pressure of about 1 atmospheres to about 50 atmospheres.

18. The process according to claim 9 wherein at least 25 percent by weight of the wash filtrate and 25 percent by weight of the mother liquor is routed to said oxidation zone.

19. The process according to claim 18 wherein said separation zone comprises at least one pressure filtration device.

20. The process according to claim 19 wherein said pressure filtration device comprises at least one filter cell and wherein at least one filter cell accumulates at least 0.25 inch in depth of said filter cake.

21. The process according to claim 20 wherein there is a reservoir over said filter cake which is at least 0.25 inch in depth.

22. The process according to claim 21 wherein said pressure filtration device operates at a temperature between about 25° C. to about 160° C.

23. The process according to claim 22 wherein said pressure filtration device is operated at a pressure of about 1 atmosphere to about 50 atmospheres.

24. The process according to claim 23 wherein step (c) comprises routing at least a 50 percent by weight of said wash filtrate and 50 percent by weight of said mother liquor to said oxidation zone.

25. The process according to claim 19 or 24 wherein said pressure filtration device is a rotary pressure drum filter.

26. The process according to claim 18 wherein said pressure filtration device is operated at a pressure of about 1 atmospheres to about 50 atmospheres.

27. A process comprising:
   (a) cooling an oxidizer purge stream in a solids enrichment zone to form a purge slurry comprising a metal catalyst, said oxidizer purge stream comprising a purge from an oxidizer mother liquor, said oxidizer mother liquor recycled to an oxidation zone, and obtained from a solid liquid separation zone;
   (b) subjecting said purge slurry to separation in a separation zone comprising a filtration zone and a washing zone, to produce a washed cake, mother liquor and a wash filtrate; wherein at least 80% of said metal catalyst from said purge slurry is recovered through said separation zone into said mother liquor and said wash filtrate cumulative; and
   (c) routing at least a portion of said metal catalyst recovered from said separation zone to said oxidation zone.

28. The process according to claim 27 wherein said separation zone comprises at least one pressure filtration device.

29. The process according to claim 28 wherein said pressure filtration device comprises at least one filter cell and wherein at least one filter cell accumulates at least 0.25 inch in depth of said filter cake.

30. The process according to claim 29 wherein there is a reservoir over said filter cake which is at least 0.25 inch in depth.

31. The process according to claim 30 wherein said pressure filtration device operates at a temperature between about 25° C. to about 160° C.

32. The process according to claim 27 wherein step (c) comprises routing at least a 10 percent by weight of said wash filtrate or at least a portion of said mother liquor to said oxidation zone.

33. The process according to claim 27 wherein step (c) comprises routing at least a 50 percent by weight of said wash filtrate or at least a portion of said mother liquor to said oxidation zone.

34. The process according to claim 28 or 33 wherein said pressure filtration device is a rotary pressure drum filter.

35. The process according to claim 31 wherein said pressure filtration device is operated at a pressure of about 1 atmospheres to about 50 atmospheres.

* * * * *